(12) United States Patent
Kim et al.

(10) Patent No.: US 10,509,290 B2
(45) Date of Patent: Dec. 17, 2019

(54) ELECTROCHROMIC APPARATUS AND METHOD FOR MANUFACTURING ELECTROCHROMIC APPARATUS

(71) Applicants: Sukchan Kim, Tokyo (JP); Tohru Yashiro, Kanagawa (JP); Hidekazu Yaginuma, Kanagawa (JP); Yoshihisa Naijo, Kanagawa (JP); Kohji Takeuchi, Kanagawa (JP); Yasuhiro Takahashi, Kanagawa (JP); Atsushi Ohshima, Kanagawa (JP)

(72) Inventors: Sukchan Kim, Tokyo (JP); Tohru Yashiro, Kanagawa (JP); Hidekazu Yaginuma, Kanagawa (JP); Yoshihisa Naijo, Kanagawa (JP); Kohji Takeuchi, Kanagawa (JP); Yasuhiro Takahashi, Kanagawa (JP); Atsushi Ohshima, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 30 days.

(21) Appl. No.: 15/885,915

(22) Filed: Feb. 1, 2018

(65) Prior Publication Data
US 2018/0231857 A1 Aug. 16, 2018

(30) Foreign Application Priority Data
Feb. 15, 2017 (JP) ................. 2017-025943

(51) Int. Cl.
*G02F 1/155* (2006.01)
*G02F 1/1523* (2019.01)
(Continued)

(52) U.S. Cl.
CPC ............ *G02F 1/155* (2013.01); *G02F 1/1525* (2013.01); *G02F 1/1533* (2013.01);
(Continued)

(58) Field of Classification Search
CPC ... C09K 2211/1029; C09K 9/02; G02F 1/155; G02F 1/15245; G02F 1/161; G02F 1/1525; G02F 1/1533; G02C 7/02
(Continued)

(56) References Cited

U.S. PATENT DOCUMENTS 5,822,107 A 10/1998 Lefrou et al.
6,118,573 A * 9/2000 Kubo ................. G02F 1/155
252/511
(Continued)

FOREIGN PATENT DOCUMENTS

EP 2 233 964 A1 9/2010
JP 2-138720 11/1990
(Continued)

OTHER PUBLICATIONS

Extended European Search Report dated Jun. 29, 2018 in Patent Application No. 18154253.1.

*Primary Examiner* — Tuyen Tra
(74) *Attorney, Agent, or Firm* — Oblon, McClelland, Maier & Neustadt, L.L.P.

(57) ABSTRACT

An electrochromic apparatus includes a first substrate, a first electrode layer, an electrochromic layer, an electrolyte layer, a second substrate, a second electrode layer, a first extraction electrode layer, a second extraction electrode layer, and a partition wall. The first extraction electrode layer contacts the first electrode layer and is isolated from the second electrode layer and the electrochromic layer. The second extraction electrode layer contacts the second electrode layer and is isolated from the first electrode layer and the electrolyte layer. The partition wall is electrically insulative and sandwiched between the first extraction electrode layer and the electrolyte layer and between the second extraction electrode layer and the electrolyte layer.

12 Claims, 3 Drawing Sheets

(51) Int. Cl.
 G02F 1/153 (2006.01)
 G02F 1/1524 (2019.01)
 G02F 1/161 (2006.01)
 G02C 7/02 (2006.01)
 C09K 9/02 (2006.01)

(52) U.S. Cl.
 CPC .......... G02F 1/15245 (2019.01); G02F 1/161 (2013.01); *C09K 9/02* (2013.01); *C09K 2211/1029* (2013.01); *G02C 7/02* (2013.01)

(58) Field of Classification Search
 USPC .................... 359/265–275, 900; 345/105
 See application file for complete search history.

(56) References Cited

U.S. PATENT DOCUMENTS

| | | | |
|---|---|---|---|
| 2003/0052838 A1* | 3/2003 | Kim | G02C 7/101 345/32 |
| 2010/0265456 A1 | 10/2010 | Matsui | |
| 2012/0033286 A1 | 2/2012 | Yashiro et al. | |
| 2012/0075575 A1 | 3/2012 | Matsui | |
| 2012/0075576 A1 | 3/2012 | Matsui | |
| 2012/0075578 A1 | 3/2012 | Matsui | |
| 2012/0081659 A1 | 4/2012 | Matsui | |
| 2012/0139824 A1 | 6/2012 | Takahashi et al. | |
| 2013/0258439 A1 | 10/2013 | Naijo et al. | |
| 2014/0376075 A1 | 12/2014 | Dubrenat et al. | |
| 2016/0033841 A1 | 2/2016 | Gauthier et al. | |
| 2017/0031226 A1 | 2/2017 | Gauthier et al. | |
| 2017/0176833 A1 | 6/2017 | Goto et al. | |
| 2018/0101080 A1 | 4/2018 | Gauthier et al. | |

FOREIGN PATENT DOCUMENTS

| | | |
|---|---|---|
| JP | 2007-171781 | 7/2007 |
| JP | 2008-116718 | 5/2008 |
| JP | 2012-053446 | 3/2012 |
| JP | 2012-137736 | 7/2012 |
| JP | 2013-077028 | 4/2013 |
| JP | 2013-117689 | 6/2013 |
| JP | 2013-210581 | 10/2013 |
| JP | 2014-032353 | 2/2014 |
| JP | 2015-011074 | 1/2015 |
| JP | 2015-014743 | 1/2015 |
| JP | 2015-094924 | 5/2015 |
| JP | 2016-156930 | 9/2016 |
| JP | 2017-111309 | 6/2017 |
| WO | WO1998/035267 A1 | 8/1998 |
| WO | WO 2014/134714 A2 | 9/2014 |
| WO | WO 2015/089663 A1 | 6/2015 |
| WO | WO2017/104466 A1 | 6/2017 |

* cited by examiner

ELECTROCHROMIC APPARATUS AND METHOD FOR MANUFACTURING ELECTROCHROMIC APPARATUS

CROSS-REFERENCE TO RELATED APPLICATION

This patent application is based on and claims priority pursuant to 35 U.S.C. § 119 to Japanese Patent Application No. 2017-025943, filed on Feb. 15, 2017, in the Japanese Patent Office, the entire disclosure of which is hereby incorporated by reference herein.

BACKGROUND

Technical Field

Exemplary embodiments generally relate to an electrochromic apparatus and a method for manufacturing the electrochromic apparatus.

Background Art

Electrochromism is a phenomenon displayed by some materials of reversibly changing color as oxidation-reduction reaction reversibly occurs in the materials in response to a voltage. Apparatuses utilizing electrochromism are called electrochromic apparatuses. The electrochromic apparatuses have been widely studied with expectation of various applications of electrochromism.

Electrochromic materials used for the electrochromic apparatuses include organic materials and inorganic materials. The organic materials, capable of developing various colors depending on the molecular structure, are promising materials for color display. The inorganic materials have some difficulties in color development control, however, they are under study with expectation of application to a dimming glass and a neutral-density (ND) filter which take advantage of low color saturation of the inorganic materials.

One example of application to healthcare products is dimming glasses. The dimming glasses include a lens and an electrochromic apparatus disposed on a surface of the lens or inside the lens. An electric signal controls the transmittance of the lens. The dimming glasses are actively developed to utilize an advantage of allowing a user to adjust the transmittance of the lens flexibly according to sensibility of the user and an environment.

In order to put the electrochromic apparatus into practical use, the electrochromic apparatus is requested to be electrically connected to a power supply and a driving circuit stably. In order to stabilize electrical connection, the electrochromic apparatus is connected to the power supply and the driving circuit effectively at a low resistance. Hence, the electrochromic apparatus includes an extraction electrode as a part of an electrode effectively.

However, since electrochromism uses electrolyte that is liquid, solid, or semisolid for oxidation-reduction, the electrolyte may corrode the extraction electrode, making it difficult to retain the low resistance for a long time. Additionally, a connection portion between the electrochromic apparatus and each of the power supply and the driving circuit may have an insufficient mechanical strength, adversely affecting stable color developing and reducing.

SUMMARY

This specification describes below an improved electrochromic apparatus. In one embodiment, the electrochromic apparatus includes a first substrate and a first electrode layer being disposed on the first substrate. An electrochromic layer is disposed on the first electrode layer. An electrolyte layer is disposed on the electrochromic layer. A second substrate is disposed opposite the first substrate. A second electrode layer is disposed on the second substrate and disposed opposite the first electrode layer. A first extraction electrode layer contacts the first electrode layer and is isolated from the second electrode layer and the electrochromic layer. A second extraction electrode layer contacts the second electrode layer and is isolated from the first electrode layer and the electrolyte layer. A partition wall is electrically insulative and sandwiched between the first extraction electrode layer and the electrolyte layer and between the second extraction electrode layer and the electrolyte layer.

This specification further describes an improved method for manufacturing an electrochromic apparatus. The method includes forming a first electrode layer on a first substrate, forming an electrochromic layer on the first electrode layer, forming a first extraction electrode layer on the first electrode layer, forming a second electrode layer on a second substrate, forming a second extraction electrode layer on the second electrode layer, forming a partition wall including a plurality of holes through which the electrochromic layer, the first extraction electrode layer, and the second extraction electrode layer are inserted, adhering the partition wall to the first substrate, forming an electrolyte layer on the electrochromic layer, and bonding the first substrate with the second substrate.

BRIEF DESCRIPTION OF THE DRAWINGS

A more complete appreciation of the embodiments and many of the attendant advantages and features thereof can be readily obtained and understood from the following detailed description with reference to the accompanying drawings, wherein.

Figure 1:
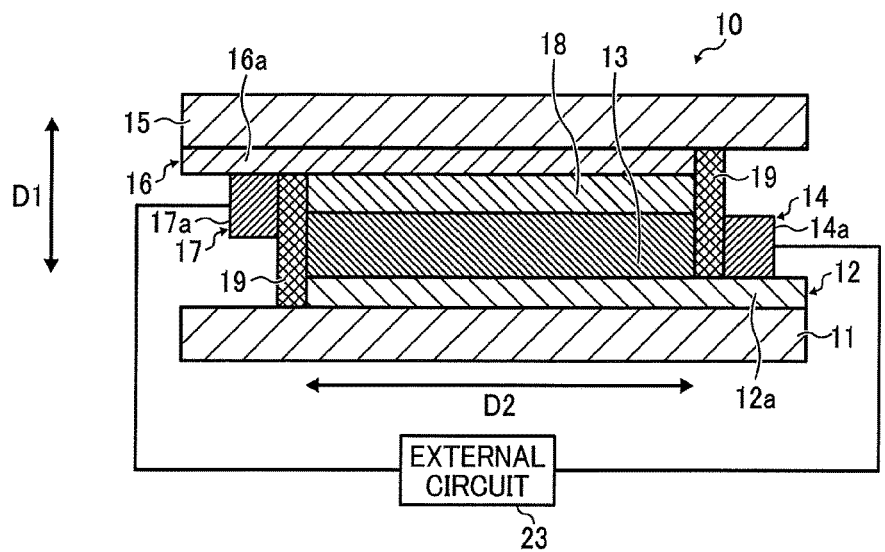
FIG. 1 is a schematic cross-sectional view of an electrochromic apparatus according to a first embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION OF THE DISCLOSURE

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Referring now to the drawings, wherein like reference numerals designate identical or corresponding parts throughout the several views, particularly to FIG. 1, an electrochromic apparatus 10 according to a first embodiment is explained.

FIG. 1 is a schematic cross-sectional view of the electrochromic apparatus 10. The electrochromic apparatus 10 includes a first substrate 11, a first electrode layer 12, an electrochromic layer 13, an electrolyte layer 18, a second substrate 15, a second electrode layer 16, a first extraction electrode layer 14, a second extraction electrode layer 17, and a partition wall 19.

The first electrode layer 12 is disposed on the first substrate 11. The electrochromic layer 13 is disposed on the first electrode layer 12. The electrolyte layer 18 is disposed on the electrochromic layer 13. The second substrate 15 is disposed opposite the first substrate 11. The second electrode layer 16 is disposed on the second substrate 15 and disposed opposite the first electrode layer 12. The first extraction electrode layer 14 contacts the first electrode layer 12 and does not contact the second electrode layer 16 and the electrochromic layer 13. In other words, the first extraction electrode layer 14 is isolated from the second electrode layer 16 and the electrochromic layer 13. As one example, the first extraction electrode layer 14 is disposed on at least a part of a first outboard portion 12a of the first electrode layer 12. The first outboard portion 12a is disposed outboard from the electrochromic layer 13. The electrochromic layer 13 is not disposed on the first outboard portion 12a of the first electrode layer 12. The second extraction electrode layer 17 contacts the second electrode layer 16 and does not contact the first electrode layer 12 and the electrolyte layer 18. In other words, the second extraction electrode layer 17 is isolated from the first electrode layer 12 and the electrolyte layer 18. As one example, the second extraction electrode layer 17 is disposed on at least a part of a second outboard portion 16a of the second electrode layer 16. The second outboard portion 16a is disposed outboard from the electrolyte layer 18. The electrolyte layer 18 is not disposed on the second outboard portion 16a of the second electrode layer 16. The partition wall 19 that is electrically insulative is sandwiched between the first extraction electrode layer 14 and the electrolyte layer 18 and between the second extraction electrode layer 17 and the electrolyte layer 18.

According to this embodiment, a partition wall (e.g., the partition wall 19) that is electrically insulative is sandwiched between an extraction electrode layer (e.g., the first extraction electrode layer 14) and an electrolyte layer (e.g., the electrolyte layer 18) and between an extraction electrode layer (e.g., the second extraction electrode layer 17) and the electrolyte layer. Accordingly, the partition wall prevents an extraction electrode from being affected by electrolyte. Consequently, the electrochromic apparatus 10 enhances durability of electrical connection in view of chemical durability, suppresses degradation of the extraction electrode, and attains stable color developing and reducing.

The extraction electrode layer increases the area of an electrode connected to an external circuit, attaining electrical connection at a decreased resistance, improving electrical connection, and stabilizing color developing and reducing. Accordingly, the electrochromic apparatus 10 attains electrical connection at a decreased resistance, enhancing durability of electrical connection in view of mechanical durability and suppressing degradation of the extraction electrode.

Alternatively, the electrochromic apparatus 10 according to this embodiment may include other layers as needed. For example, the other layers include a protective layer, a degradation prevention layer, a barrier layer, a peeling-off prevention layer, a cushion layer, a reverse reaction layer, an auxiliary electrode layer, a flattening layer, and a refractive index adjusting layer.

Figure 2:
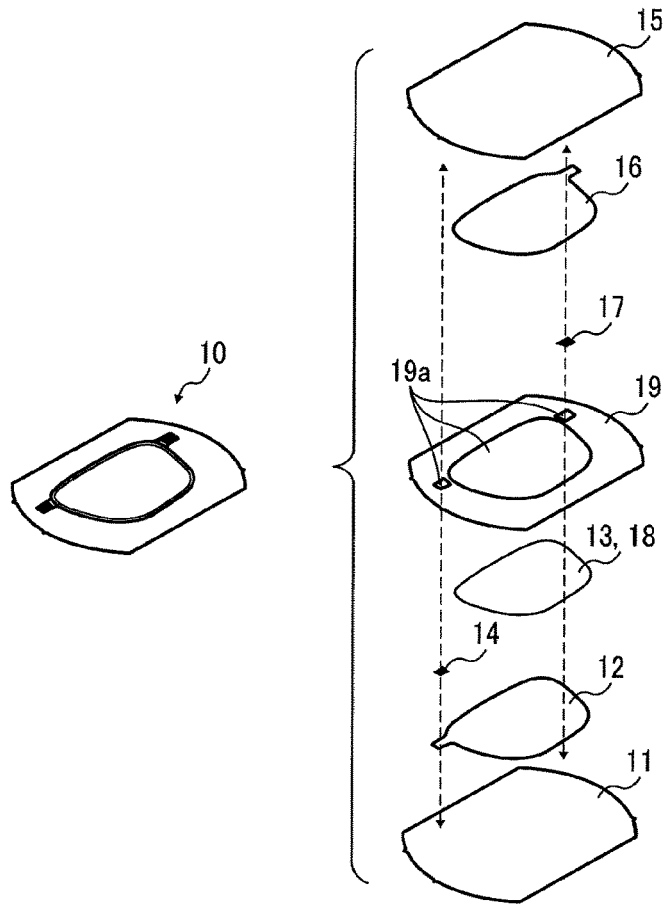
FIG. 2 is an exploded diagram of the electrochromic apparatus depicted in FIG. 1.

FIG. 2 is an exploded diagram of the electrochromic apparatus 10 as one example. FIG. 2 illustrates an example of the partition wall 19 made of resin processed into a sheet. Alternatively, the electrochromic apparatus 10 illustrated in FIG. 2 may be processed to have other shapes.

A description is provided of a method for manufacturing the electrochromic apparatus 10 according to this embodiment.

As illustrated in FIG. 2, the method includes first to ninth processes described below. In the first process, the first electrode layer 12 is formed on the first substrate 11. In the second process, the electrochromic layer 13 is formed on the first electrode layer 12. In the third process, the first extraction electrode layer 14 is formed on the first electrode layer 12. In the fourth process, the second electrode layer 16 is formed on the second substrate 15. In the fifth process, the second extraction electrode layer 17 is formed on the second electrode layer 16. In the sixth process, the partition wall 19 made of a resin sheet is formed to have a plurality of holes 19a through which the electrochromic layer 13, the first extraction electrode layer 14, and the second extraction electrode layer 17, respectively, are inserted. In the seventh process, the partition wall 19 that is sheet-shaped is adhered to the first substrate 11. In the eighth process, the electrolyte layer 18 is formed on the electrochromic layer 13. In the ninth process, the first substrate 11 is bonded with the second substrate 15.

A description is provided of a configuration of the first substrate 11 and the second substrate 15.

Each of the first substrate 11 and the second substrate 15 is made of thermoforming resin. For example, each of the first substrate 11 and the second substrate 15 is a resin substrate made of polycarbonate resin, acrylic resin, polyethylene, polyvinyl chloride, polyester, epoxy resin, melamine resin, phenolic resin, polyurethane resin, polyimide resin, or the like.

A description is provided of a configuration of the first electrode layer 12 and the second electrode layer 16.

Each of the first electrode layer 12 and the second electrode layer 16 is made of any material that is transparent and conductive. The material of each of the first electrode layer 12 and the second electrode layer 16 is selected properly according to objectives. For example, each of the first electrode layer 12 and the second electrode layer 16 is made of indium tin oxide (ITO), fluorine tin oxide (FTO), antimony tin oxide (ATO), or the like. Preferably, the material of each of the first electrode layer 12 and the second electrode layer 16 is an inorganic material containing any one of indium oxide, tin oxide, and zinc oxide that are prepared by vacuum film formation.

The indium oxide, the tin oxide, and the zinc oxide facilitate film formation by spattering and enhance transparency and conductivity. Among the indium oxide, the tin oxide, and the zinc oxide, InSnO, GaZnO, SnO, $In_2O_3$, and ZnO are preferable. Further, a network electrode made of silver, gold, carbon nanotube, metal oxide, or the like that has transparency and a composite layer of those materials may be used.

The electrode layer hereinafter denotes one or both of the first electrode layer 12 and the second electrode layer 16 without distinguishing the first electrode layer 12 from the second electrode layer 16.

The electrode layer has a thickness that is not limited and is adjusted to attain an electric resistance value needed for oxidation-reduction reaction of electrochromism. For example, if the electrode layer is made of ITO, the thickness of the electrode layer is in a range of from 50 nm to 500 nm.

A description is provided of a configuration of the electrochromic layer 13.

The electrochromic layer 13 is made of an electrochromic material and contains other material as needed. The electrochromic material is either an inorganic electrochromic compound or an organic electrochromic compound. Alternatively, the electrochromic material may be a conductive high polymer that has electrochromism.

Examples of the inorganic electrochromic compound include tungsten oxide, molybdenum oxide, iridium oxide, and titanium oxide.

Examples of the organic electrochromic compound include viologen, rare-earth phthalocyanine, and styryl.

Examples of the conductive high polymer include polypyrrol, polythiophene, polyaniline, and a derivative of those.

The electrochromic layer 13 has a structure in which a conductive fine particle or a semiconductive fine particle bears an organic electrochromic compound. For example, a fine particle having a particle diameter in a range of from about 5 nm to about 50 nm is sintered on a surface of an electrode. A surface of the fine particle absorbs phosphonic acid and an organic electrochromic compound having a polar group such as a carboxyl group and a silanol group. The above-described structure causes an electron to be injected into the organic electrochromic compound effectively by using substantial surface effect of the fine particle, attaining high speed response compared to general electrochromic display elements.

Additionally, the fine particle creates a transparent film as a display layer, enhancing a developing color density of an electrochromic pigment. Alternatively, the conductive fine particle or the semiconductive fine particle may bear the organic electrochromic compound of multiple types.

Examples of the above-described electrochromic material include a low molecular organic electrochromic compound and a conductive high molecular compound as a polymer electrochromic compound or a pigment electrochromic compound. The low molecular organic electrochromic compound includes azo benzene, anthraquinone, diarylethene, dihydroprene, dipyridine, styryl, styryl spiropyran, spiro oxazine, spirothiopyran, thioindigo, tetrathiafulvalene, terephthalic acid, triphenylmethane, triphenylamine, naphthopyran, viologen, pyrazoline, phenazine, phenylenediamine, phenoxazine, phenothiazine, phthalocyanine, fluoran, fulgide, benzopyran, and metallocene. The conductive high polymer compound includes polyaniline and polythiophene. Among the above-described materials, a viologen compound or a dipyridine compound is preferable because the viologen compound and the dipyridine compound have a low potential for color developing and reducing and a proper color value.

Examples of the viologen compound include compounds disclosed by JP-3955641-B2 (JP-2001-510590-A) and JP-2007-171781-A.

Examples of the dipyridine compound include compounds disclosed by JP-2007-171781-A and JP-2008-116718-A.

Among the above-described compounds, the dipyridine compound defined by a formula (1) below is preferable because the dipyridine compound has a proper color value for color developing.

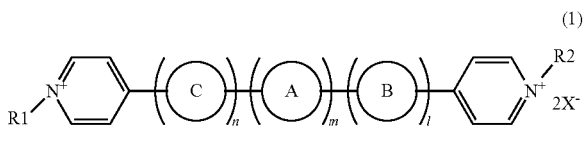

(1)

In the above formula (1), R1 and R2 represent an alkyl group or an aryl group that has a carbon number in a range of from 1 to 8 and may have a substituent independently from each other. At least one of R1 and R2 has a substituent selected from COOH, PO(OH)$_2$, and Si(OC$_k$H$_{2k+1}$)$_3$. k represents a number in a range of from 1 to 20.

X represents monovalent anion and is not limited as long as it is paired with a cation portion stably. Examples of the monovalent anion include Br ion (Br$^-$), Cl ion (Cl$^-$), ClO$_4$ ion (ClO$_4^-$), PF$_6$ ion (PF$_6^-$), and BF$_4$ ion (BF$_4^-$). n, m, and l represent 0, 1, or 2. A, B, and C represent an alkyl group, an aryl group, or a heterocycle group that has a carbon number in a range of from 1 to 20 and may have a substituent independently from each other.

The electrochromic compounds of a metal complex base and a metal oxide base include the inorganic electrochromic compounds such as titanium oxide, vanadium oxide, tungsten oxide, indium oxide, iridium oxide, nickel oxide, and prussian blue.

The conductive fine particle or the semiconductive fine particle is not limited and is selected properly according to objectives. However, metal oxide is preferable.

The materials of the metal oxide include metal oxide containing a main ingredient such as titanium oxide, zinc oxide, tin oxide, zirconium oxide, cerium oxide, yttrium oxide, boron oxide, magnesium oxide, strontium titanate, potassium titanate, barium titanate, calcium titanate, calcium oxide, ferrite, hafnium oxide, tungsten oxide, iron oxide, copper oxide, nickel oxide, cobalt oxide, barium oxide, strontium oxide, vanadium oxide, aluminosilicate, calcium phosphate, and aluminosilicate. One of the above materials may be used solely or two or more of the above materials may be used in combination.

In view of electrical characteristics such as electrical conductivity and physical characteristics such as optical property, one or a mixture of titanium oxide, zinc oxide, tin oxide, zirconium oxide, iron oxide, magnesium oxide, indium oxide, and tungsten oxide provides color display that improves response speed for color developing and reducing. Especially, titanium oxide provides color display that further improves response speed for color developing and reducing.

The shape of the conductive fine particle or the semiconductive fine particle is not limited. However, in order to bear the electrochromic compound efficiently, the shape that increases the surface area per unit volume (hereinafter referred to as the specific surface area) is employed.

For example, if the fine particle is an aggregation of nanoparticles, the fine particle has a great specific surface area. Hence, the fine particle bears the electrochromic compound efficiently, improving the display contrast ratio for color developing and reducing.

The thickness of the electrochromic layer 13 depicted in FIG. 1 is not limited and is selected properly according to objectives. Preferably, the electrochromic layer 13 has a thickness in a range of from 0.2 micrometers to 5.0 micrometers. If the thickness of the electrochromic layer 13 is smaller than 0.2 micrometers, the electrochromic layer 13 may not achieve a target color developing density. Conversely, if the thickness of the electrochromic layer 13 exceeds 5.0 micrometers, the electrochromic layer 13 may increase manufacturing costs and degrade visibility by coloring. The electrochromic layer 13 and a conductive fine particle layer or a semiconductive fine particle layer may be produced by vacuum deposition. Preferably, in view of productivity, the electrochromic layer 13 and the conductive fine particle layer or the semiconductive fine particle layer are produced by application as particle-dispersed paste.

A description is provided of a configuration of the electrolyte layer 18.

Preferably, the electrolyte layer 18 is a solid electrolyte layer. Alternatively, the electrolyte layer 18 may be semi-solid or liquid. If the electrolyte layer 18 is solid, the electrolyte layer 18 is a film in which curable resin, that is, photo-curable resin or heat-curable resin, holds an electrolyte, for example.

Preferably, the electrolyte layer 18 includes a mixture of the inorganic fine particle that controls the layer thickness of the electrolyte layer 18. Preferably, the electrolyte layer 18, as a solution in which the inorganic fine particle, the curable resin, and the electrolyte are mixed, coats the electrochromic layer 13. Thereafter, the electrolyte layer 18 is produced into a film hardened optically or thermally. Alternatively, the electrolyte layer 18 may be produced in other methods. For example, after a porous inorganic fine particle layer is produced, the electrolyte layer 18, as a solution in which the curable resin and the electrolyte are mixed, coats the electrochromic layer 13 so that the solution permeates the inorganic fine particle layer. Thereafter, the electrolyte layer 18 is produced into a film hardened optically or thermally. If the electrochromic layer 13 is a layer in which a conductive nanoparticle or a semiconductive nanoparticle bears an electrochromic compound, the electrolyte layer 18, as a solution in which the curable resin and the electrolyte are mixed, coats the electrochromic layer 13 so that the solution permeates the electrochromic layer 13. Thereafter, the electrolyte layer 18 is produced into a film hardened optically or thermally.

As an electrolytic solution, that is, the solution in which the curable resin and the electrolyte are mixed, a solution in which a liquid electrolyte such as ionic liquid or a solid electrolyte is dissolved in a solvent is used. Examples of the material of the electrolyte include inorganic ion salt such as alkali metal salt and alkaline earth metal salt, quarternary ammonium salt, and supporting electrolyte of acids and alkalies. Specifically, the materials of the electrolyte include $LiClO_4$, $LiBF_4$, $LiAsF_6$, $LiPF_6$, $LiCF_3SO_3$, $LiCF_3COO$, $KCl$, $NaClO_3$, $NaCl$, $NaBF_4$, $NaSCN$, $KBF_4$, $Mg(ClO_4)_2$, and $Mg(BF_4)_2$.

For example, the solvent includes propylene carbonate, acetonitrile, gamma-butyrolactone, ethylene carbonate, sulfolane, dioxolane, tetrahydrofuran, 2-methyl tetrahydrofuran, dimethyl sulfoxide, 1,2-dimethoxyethane, 1,2-ethoxy methoxyethane, polyethylene glycol, alcohols, and a mixed solvent of those.

For example, the curable resin includes general materials of photo-curable resin and heat-curable resin such as acrylic resin, urethane resin, epoxy resin, vinyl chloride resin, ethylene resin, melamine resin, and phenolic resin. Preferably, the curable resin includes a material that has enhanced solubility with an electrolyte. Preferably, the material having enhanced solubility with the electrolyte includes a derivative of ethylene glycol such as polyethylene glycol and polypropylene glycol. Preferably, the curable resin includes photo-curable resin because the photo-curable resin produces an element at a low temperature in a shortened time compared to a method for producing a thin film by thermal polymerization and solvent evaporation.

Especially, as a preferable combination, the electrolyte layer 18 includes a solid solution of matrix polymer containing oxyethylene chain and oxypropylene chain and ionic liquid. The preferable combination enhances both the hardness and the ionic conductivity readily.

The material of the inorganic fine particle is not limited as long as it produces a porous layer and holds the electrolyte and the curable resin. Preferably, in view of stability and visibility in electrochromic reaction, the inorganic fine particle is made of a material that is high in insulation, transparency, and durability. For example, the inorganic fine particle is made of oxide or sulfide of silicon, aluminum, titanium, zinc, tin, or the like or a mixture of those.

The size (e.g., the average particle diameter) of the inorganic fine particle is not limited and is selected properly according to objectives. Preferably, the inorganic fine particle has a size in a range of from 10 nanometers to 10 micrometers. More preferably, the inorganic fine particle has a size in a range of from 10 nanometers to 100 nanometers.

A description is provided of a configuration of the first extraction electrode layer 14 and the second extraction electrode layer 17.

The first extraction electrode layer 14 and the second extraction electrode layer 17 are modified properly. For example, each of the first extraction electrode layer 14 and the second extraction electrode layer 17 is made of a conductive material selected from a group composed of Au, Ag, Al, Sn, Zn, Zr, Ge, Pt, Rd, Ni, W, Pd, Cr, Mo, Rh, and the like. The first extraction electrode layer 14 and the second extraction electrode layer 17 that are made of the above-described conductive material contact the first electrode layer 12 and the second electrode layer 16, respectively. Additionally, the first extraction electrode layer 14 and the second extraction electrode layer 17 are produced by patterning in a part of a lens, preferably, outside an optical designated region of the lens, thus improving coupling (e.g., contact) with the first electrode layer 12 and the second electrode layer 16 and with an external circuit 23 and attaining reliability.

The extraction electrode layer hereinafter denotes one or both of the first extraction electrode layer 14 and the second extraction electrode layer 17 without distinguishing the first extraction electrode layer 14 from the second extraction electrode layer 17.

The extraction electrode layer is produced by vacuum deposition with the above-described conductive material. Alternatively, the extraction electrode layer may be produced by application of ink made of the above-described conductive material.

The thickness of the extraction electrode layer is modified properly. In the electrochromic apparatus 10 illustrated in FIG. 1, the thickness of the extraction electrode layer, that is, each of the first extraction electrode layer 14 and the second extraction electrode layer 17, vertically in FIG. 1 in a laminating direction D1 in which the layers of the electrochromic apparatus 10 are laminated is not smaller than 1 micrometer. The width of the extraction electrode layer, that is, each of the first extraction electrode layer 14 and the second extraction electrode layer 17, horizontally in FIG. 1 in a surface direction D2 of the first substrate 11 and the second substrate 15 is not smaller than 50 micrometers.

The first extraction electrode layer 14 includes a first lateral end face 14a and the second extraction electrode layer 17 includes a second lateral end face 17a. The first lateral end face 14a and the second lateral end face 17a are electrically connected to the external circuit 23. The first lateral end face 14a and the second lateral end face 17a facilitate installation of the electrochromic apparatus 10, saving space further.

A description is provided of a configuration of the partition wall 19.

As illustrated in FIG. 1, the partition wall 19 isolates the first extraction electrode layer 14 and the second extraction electrode layer 17 from the electrolyte layer 18. If the electrolyte layer 18 is liquid or semiliquid, the partition wall 19 surrounds the electrolyte layer 18, preventing the electrolyte of the electrolyte layer 18 from leaking from the electrochromic apparatus 10.

For example, the partition wall 19 is produced by application of insulative resin or the like that is ultraviolet-curable or heat-curable and subsequent hardening. Alternatively, the partition wall 19 may be produced by patterning of insulative resin or the like that is ultraviolet-curable or heat-curable into a sheet, adhesion of the sheet, and subsequent hardening. Yet alternatively, the partition wall 19 may be produced by patterning of a pressure-sensitive adhesive into a sheet and subsequent adhesion of the sheet.

As illustrated in FIG. 2, the partition wall 19 according to this embodiment is made of the resin sheet. The partition wall 19 includes the plurality of holes 19a (e.g., a plurality of through-holes) through which the electrochromic layer 13, the first extraction electrode layer 14, and the second extraction electrode layer 17 are inserted, respectively. The partition wall 19 has a moisture barrier property or an oxygen barrier property.

Alternatively, a resin barrier layer may be produced separately from the partition wall 19 to enhance a barrier property advantageously.

The thickness of the partition wall 19 depicted in FIG. 1 is not limited and is selected properly according to objectives. In the electrochromic apparatus 10 illustrated in FIG. 1, the thickness of the partition wall 19 vertically in FIG. 1 in the laminating direction D1 in which the layers of the electrochromic apparatus 10 are laminated is equivalent to a gap (e.g., an interval) between the first electrode layer 12 and the second electrode layer 16.

A peel strength of the partition wall 19 against the electrochromic apparatus 10 is greater than a peel strength of the electrolyte layer 18 against the electrochromic apparatus 10. Accordingly, the partition wall 19 reinforces adhesion of the electrochromic apparatus 10, improving durability of the electrochromic apparatus 10.

The peel strength denotes difficulty in peeling in the laminating direction D1 in which the layers of the electrochromic apparatus 10 are laminated, that is, a thickness direction of the electrochromic apparatus 10. The peel strength of the partition wall 19 denotes difficulty in peeling of the partition wall 19 from the first electrode layer 12, the second electrode layer 16, the first substrate 11, and the second substrate 15. The peel strength of the electrolyte layer 18 denotes difficulty in peeling of the electrolyte layer 18 from the second electrode layer 16 and the electrochromic layer 13.

The peel strength is measured by a measurement method described in chapter 10 "Adhesive strength" in Testing methods of pressure-sensitive adhesive tapes and sheets JIS Z 0237 (2009). The peel strength of the partition wall 19 is compared to the peel strength of the electrolyte layer 18 and whichever is greater is determined as a greater peel strength. If the electrolyte layer 18 is not solid, the peel strength is compared as described in chapter 14 "Inclined type ball tack" in Testing methods of pressure-sensitive adhesive tapes and sheets JIS Z 0237 (2009).

A description is provided of a construction of an electrochromic apparatus 20 according to a second embodiment of the present disclosure.

Figure 3:
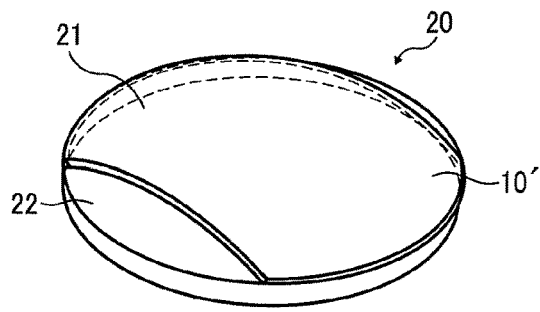
FIG. 3 is a perspective view of an electrochromic apparatus according to a second embodiment of the present disclosure.

FIG. 3 is a perspective view of the electrochromic apparatus 20. The electrochromic apparatus 20 includes a convex face 21 (e.g., a bulge) disposed on one of the first substrate 11 and the second substrate 15. An optical lens 22 having a curved face is disposed on another one of the first substrate 11 and the second substrate 15. A description of components of the electrochromic apparatus 20 that are equivalent to the components of the electrochromic apparatus 10 depicted in FIG. 1 is omitted.

As illustrated in FIG. 3, the electrochromic apparatus 20 includes the optical lens 22 disposed outside an electrochromic apparatus 10', thus attaining the desired curved face. The electrochromic apparatus 10 is modified into the electrochromic apparatus 10' to have the curved face. The curved face has a specific curvature and is modified properly. For example, the curved face is spherical, cylindrical, conical, three-dimensional, or the like. The curved face is at least a part of the electrochromic apparatus 10'. Alternatively, the electrochromic apparatus 10' may have the curved face entirely.

A description is provided of a configuration of the optical lens 22.

For example, preferred materials of the optical lens 22 include, but are not limited to, transparent resins such as polycarbonate resin, allyl diglycol carbonate resin, diallyl carbonate resin, diallyl phthalate resin, urethane resin, thiourethane resin, episulfide resin, methacrylate resin, and cycloolefin resin.

The optical lens 22 is adhesively formed by melting and subsequent rehardening of the transparent resin, curing of the transparent resin by light or heat, or adhesion of the transparent resin to the electrochromic apparatus 10' with an optical transparent adhesive or the like, while the transparent resin contacts an exterior face of the electrochromic apparatus 10'. The method for adhesively forming the optical lens 22 is not limited thereto. For example, the optical lens 22 is adhered to the electrochromic apparatus 10' by selecting a method from in-mold injection molding, film (sheet) insert injection molding, film (sheet) insert cast molding, transparent optical (optical transparent) adhesive filming, or the like.

An arbitrary spectacle power is imparted to the electrochromic apparatus 20 by adjusting at least one of the curvature of an incident face and the curvature of an emission face of the optical lens 22 based on the curvature radius thereof after curing, which is determined by considering a deformation caused by shrinkage on curing or the like.

After the optical lens 22 is formed, the optical lens 22 is processed to have the desired curved face by cutting. Thus, the optical lens 22 is processed to have desired characteristics (e.g., spectacle power) according to specific user conditions. Accordingly, there is no need to prepare separate molds and components for each product different in shape. Thus, a wide variety of high-accuracy products is produced readily in small quantities.

Figure 4:
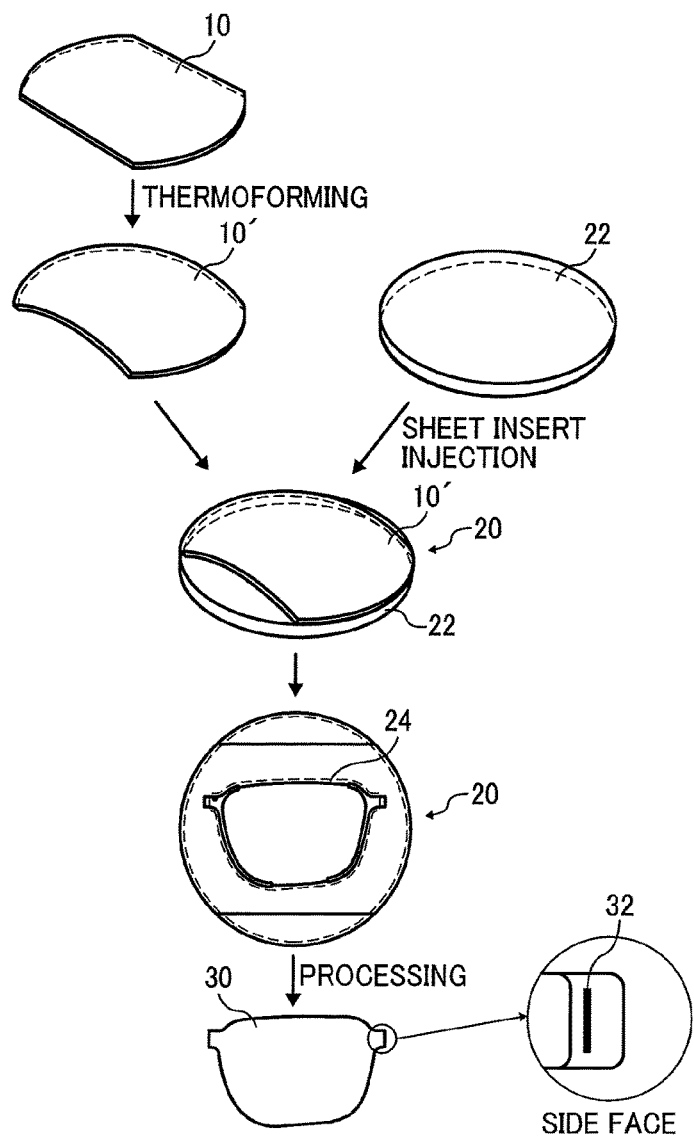
FIG. 4 is an exploded perspective view of the electrochromic apparatus depicted in FIG. 3.

Referring to FIG. 4, a description is provided of one example of a production method for producing the electrochromic apparatus 20 according to the second embodiment and one example of processing of the electrochromic apparatus 20.

FIG. 4 is an exploded perspective view of the electrochromic apparatus 20 employing the electrochromic apparatus 10 according to the first embodiment, for example. The electrochromic apparatus 10 is produced into the electrochromic apparatus 10' by thermoforming, for example. The electrochromic apparatus 10' is attached to the optical lens 22 by sheet insert injection to obtain a desired processing line 24. The electrochromic apparatus 10' combined with the optical lens 22 is processed into the electrochromic apparatus 20 having a spectacle lens shape.

The electrochromic apparatus 20 produced as described above exposes, at a side face thereof, the first extraction electrode layer 14 and the second extraction electrode layer 17. The first extraction electrode layer 14 and the second extraction electrode layer 17 are applied with conductive paste, for example, to produce a contact portion 32 to be coupled with a driving circuit. As illustrated in an enlarged view illustrating the side face of the electrochromic apparatus 20 in FIG. 4, the contact portion 32 is exposed at the side face (e.g., an end portion) of the electrochromic apparatus 20. Usage of the contact portion 32 stabilizes electrical connection of the electrochromic apparatus 20.

Figure 5:
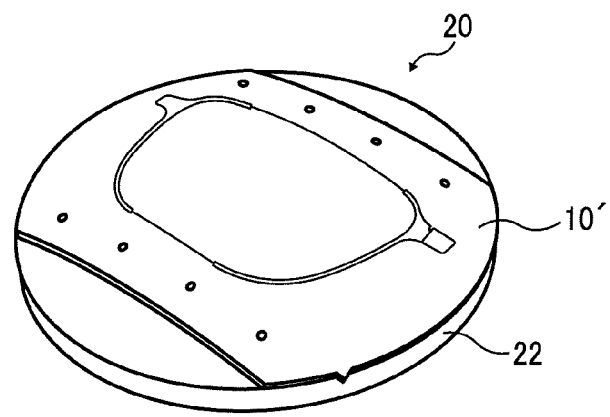
FIG. 5 is a perspective view of the electrochromic apparatus depicted in FIG. 3 at a time during production of the electrochromic apparatus.

FIG. 5 illustrates one example of the processing line 24 depicted in FIG. 4. FIG. 5 is a perspective view of the electrochromic apparatus 20 at a time during production of the electrochromic apparatus 20.

A description is provided of a construction of an electrochromic apparatus 40 according to a third embodiment of the present disclosure.

Figure 6:
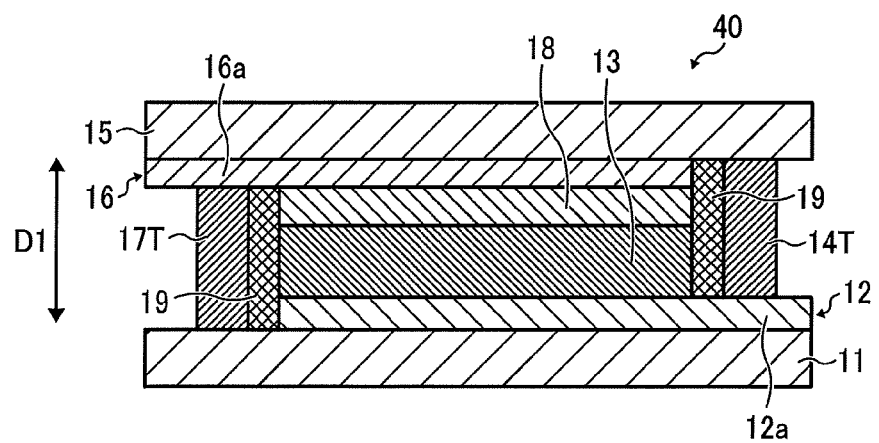
FIG. 6 is a schematic cross-sectional view of an electrochromic apparatus according to a third embodiment of the present disclosure.

FIG. 6 is a schematic cross-sectional view of the electrochromic apparatus 40. As illustrated in FIG. 6, the electrochromic apparatus 40 includes a first extraction electrode layer 14T that contacts the second substrate 15 and a second extraction electrode layer 17T that contacts the first substrate 11. That is, the first extraction electrode layer 14T and the second extraction electrode layer 17T contact the second substrate 15 and the first substrate 11 that are disposed opposite the first extraction electrode layer 14T and the second extraction electrode layer 17T, respectively. A description of components of the electrochromic apparatus 40 that are equivalent to the components of the electrochromic apparatuses 10 and 20 is omitted.

The thickness of each of the first extraction electrode layer 14T and the second extraction electrode layer 17T is greater than the thickness of each of the first extraction electrode layer 14 and the second extraction electrode layer 17 depicted in FIG. 1 in the laminating direction D1. Accordingly, the connection area where the first extraction electrode layer 14T and the second extraction electrode layer 17T are connected to the driving circuit increases, thus decreasing a contact resistance and improving stability in connection.

As illustrated in FIG. 6, the first extraction electrode layer 14T and the second extraction electrode layer 17T contact the second substrate 15 and the first substrate 11 that are disposed opposite the first extraction electrode layer 14T and the second extraction electrode layer 17T, respectively. Alternatively, other configurations may be employed.

For example, one of the first extraction electrode layer 14T and the second extraction electrode layer 17T may contact corresponding one of the second substrate 15 and the first substrate 11 that are disposed opposite the first extraction electrode layer 14T and the second extraction electrode layer 17T, respectively, thus attaining the advantages described above. A method for producing the first extraction electrode layer 14T and the second extraction electrode layer 17T as described above is modified properly. For example, a dispenser may apply conductive paste containing metallic particles.

A detailed description is provided of a first example and a second example of the present disclosure.

Examples of the present disclosure are not limited to the first example and the second example described below.

A description is provided of the first example of a method for manufacturing the first electrode layer 12, the first extraction electrode layer 14, and the electrochromic layer 13.

An elliptical polycarbonate substrate having a maximum major-axis length of 75.5 mm, a maximum minor-axis length of 54 mm, and a thickness of 0.3 mm was prepared as the first substrate 11. On the first substrate 11, an ITO film having a thickness of about 100 nm was formed by sputtering, thus forming the first electrode layer 12. Thereafter, using a shadow mask having a pattern illustrated in FIG. 2, a sliver (Ag) film having a thickness of about 200 nm was formed by sputtering, thus forming the first extraction electrode layer 14.

A titanium oxide nano particle dispersion liquid SP210 available from Showa Titanium Co., Ltd., which has an average particle diameter of 20 nm was applied to a surface of the ITO film by spin coating and was treated with annealing for 15 minutes at a temperature of 120 degrees centigrade, thus forming a titanium oxide particle film having a thickness of about 1.0 micrometer composed of a nano structure semiconductive material.

Next, a 1.5% by mass 2,2,3,3-tetrafluoropropanol solution of an electrochromic compound defined by a formula (2) below was applied onto the titanium oxide particle film by spin coating and treated with annealing for 10 minutes at a temperature of 120 degrees centigrade, to allow the titanium oxide particle film to carry or adsorb the electrochromic compound. Thus, the electrochromic layer 13 was formed.

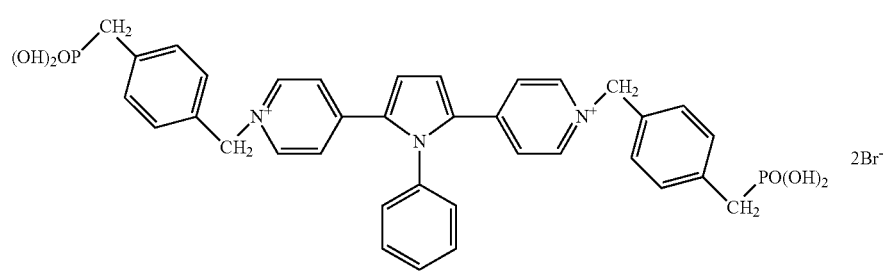

(2)

Next, a dispersion liquid of $SiO_2$ fine particles having an average primary particle diameter of 20 nm was applied onto the electrochromic layer 13 by spin coating. The dispersion liquid contains 24.8% by mass of solid contents of silica, 1.2% by mass of polyvinyl alcohol, and 74% by mass of water. Thus, an insulating inorganic fine particle layer having a thickness of 2 micrometers was formed.

A description is provided of a method for manufacturing the second electrode layer 16 and the second extraction electrode layer 17.

A polycarbonate substrate having the same shape and the same thickness as those of the first substrate 11 was prepared as the second substrate 15. On the second substrate 15, an ITO film having a thickness of about 100 nm was formed by sputtering, thus forming the second electrode layer 16. Thereafter, using a shadow mask having a pattern illustrated in FIG. 2, a sliver (Ag) film having a thickness of about 200 nm was formed by sputtering, thus forming the second extraction electrode layer 17.

A description is provided of a configuration of the partition wall 19.

As the partition wall 19, after an optical transparent adhesion sheet LA-50 available from Nitto Denko Corporation was processed to have the shape of the partition wall 19 illustrated in FIG. 2, the optical transparent adhesion sheet was adhered onto the first substrate 11 mounting the first electrode layer 12 and the electrochromic layer 13 with a laminator.

A description is provided of a method for forming and bonding the electrolyte layer 18.

A mixed solution of 100 parts by mass of polyethylene glycol diacrylate PEG400DA available from Nippon Kayaku Co., Ltd., 5 parts by mass of a photopolymerization initiator IRG184 available from BASF, and 40 parts by mass of an electrolyte (1-ethyl-3-methylimidazolium salt) was applied onto a surface of the insulating inorganic fine particle layer formed on the first substrate 11 with a dispenser. The second substrate 15 was adhered thereto with a vacuum bonding device. The applied mixed solution was irradiated with ultraviolet rays to cure to form the electrolyte layer 18.

The electrochromic apparatus 10 manufactured as described had the configuration illustrated in FIGS. 1 and 2.

Referring to FIG. 4, a description is provided of processing performed on the electrochromic apparatus 10 manufactured as described above.

The electrochromic apparatus 10 manufactured as described above was thermoformed by being sandwiched by a convex mold and a concave mold, each of which has a radius of curvature of about 130 mm while being heated at 146 degrees centigrade. Thus, the electrochromic apparatus 10' having a curved face was prepared. The second substrate 15 of the electrochromic apparatus 10' is convex.

A polycarbonate resin Iupilon® CLS3400 available from Mitsubishi Engineering-Plastics Corporation, as a material for an optical lens adhered to the electrochromic apparatus 10', and the electrochromic apparatus 10' prepared as described above were inserted into a mold and integrally molded into a lens by injection molding (e.g., sheet insert injection molding). After the processing line 24 was formed, a surface of the optical lens 22 adhesively formed on the electrochromic apparatus 10' was processed by cutting. Thus, an electrochromic apparatus 30 was prepared.

The electrochromic apparatus 30 prepared as described above had the curved face. The electrochromic apparatus 10' and the optical lens 22 were cut together into a lens shape to be fitted to an eyeglass frame.

Next, the contact portion 32 to be connected to the external circuit 23 was prepared. The electrochromic apparatus 30 having the lens shape exposes, at a side face thereof, the first extraction electrode layer 14 and the second extraction electrode layer 17. The first extraction electrode layer 14 and the second extraction electrode layer 17 were applied with conductive paste Dotite XA-910 available from Fujikura Kasei Co., Ltd. After the first extraction electrode layer 14 and the second extraction electrode layer 17 were connected to the driving circuit, the first extraction electrode layer 14 and the second extraction electrode layer 17 were heated by an oven for two hours at a temperature of 100 degrees centigrade. Thus, the contact portion 32 was prepared.

As illustrated in an enlarged view illustrating the side face of the electrochromic apparatus 30 in FIG. 4, the contact portion 32 prepared as described above was exposed at the side face (e.g., the end portion) of the electrochromic apparatus 30. Thus, the contact portion 32 was processed to stabilize electrical connection of the electrochromic apparatus 30.

A description is provided of evaluation of color developing and reducing of the electrochromic apparatus 30 prepared as described above.

It was confirmed that the electrochromic apparatus 30 stably developed magenta color derived from the electrochromic compound defined by the formula (2), when a voltage of −3.5 V was applied for 3 seconds between the first electrode layer 12 and the second electrode layer 16. Further, it was confirmed that the electrochromic apparatus 30 stably reduced magenta color.

A description is provided of the second example of the method for manufacturing the first electrode layer 12, the first extraction electrode layer 14, and the electrochromic layer 13.

The partition wall 19 in the first example was prepared by application of conductive paste containing silver filler, Dotite XA-910 available from Fujikura Kasei Co., Ltd., with a dispenser. As illustrated in FIG. 6, the first extraction electrode layer 14T and the second extraction electrode layer 17T were prepared. Other layers were prepared similarly to the first example. Thus, the electrochromic apparatus 40 was prepared.

After the electrochromic apparatus 40 prepared as described above was evaluated similarly to the first example, it was confirmed that the electrochromic apparatus 40 stably developed magenta color derived from the electrochromic compound defined by the formula (2). Further, it was confirmed that the electrochromic apparatus 40 stably reduced magenta color.

A description is provided of advantages of an electrochromic apparatus (e.g., the electrochromic apparatuses 10, 20, 30, and 40).

As illustrated in FIG. 1, the electrochromic apparatus includes a first substrate (e.g., the first substrate 11), a first electrode layer (e.g., the first electrode layer 12), an electrochromic layer (e.g., the electrochromic layer 13), an electrolyte layer (e.g., the electrolyte layer 18), a second substrate (e.g., the second substrate 15), a second electrode layer (e.g., the second electrode layer 16), a first extraction electrode layer (e.g., the first extraction electrode layer 14), a second extraction electrode layer (e.g., the second extraction electrode layer 17), and a partition wall (e.g., the partition wall 19).

The first electrode layer is disposed on the first substrate. The electrochromic layer is disposed on the first electrode layer. The electrolyte layer is disposed on the electrochromic layer. The second substrate is disposed opposite the first substrate. The second electrode layer is disposed on the second substrate and disposed opposite the first electrode layer. The first extraction electrode layer contacts the first electrode layer and does not contact the second electrode layer and the electrochromic layer. As one example, the first extraction electrode layer is disposed on at least a part of a first outboard portion (e.g., the first outboard portion 12a) of the first electrode layer. The first outboard portion is disposed outboard from the electrochromic layer in a direction perpendicular to a laminating direction (e.g., the laminating direction D1) in which the electrochromic layer is laminated on the first electrode layer. The electrochromic layer is not disposed on the first outboard portion of the first electrode layer. The second extraction electrode layer contacts the second electrode layer and does not contact the first electrode layer and the electrolyte layer. As one example, the second extraction electrode layer is disposed on at least a part of a second outboard portion (e.g., the second outboard portion 16a) of the second electrode layer. The second outboard portion is disposed outboard from the electrolyte layer in the direction perpendicular to the laminating direction. The electrolyte layer is not disposed on the second outboard portion of the second electrode layer. The partition wall that is electrically insulative is sandwiched between the first extraction electrode layer and the electrolyte layer and between the second extraction electrode layer and the electrolyte layer.

Accordingly, the electrochromic apparatus suppresses degradation of the first extraction electrode layer and the second extraction electrode layer, improves electrical connection, and stabilizes color developing and reducing.

The advantages achieved by the embodiments described above are examples and therefore are not limited to those described above.

The above-described embodiments are illustrative and do not limit the present disclosure. Thus, numerous additional modifications and variations are possible in light of the above teachings. For example, elements and features of different illustrative embodiments may be combined with each other and substituted for each other within the scope of the present invention.

Any one of the above-described operations may be performed in various other ways, for example, in an order different from the one described above.

What is claimed is:

1. An electrochromic apparatus comprising:
   a first substrate;
   a first electrode layer being disposed on the first substrate;
   an electrochromic layer disposed on the first electrode layer;
   an electrolyte layer disposed on the electrochromic layer;
   a second substrate disposed opposite the first substrate;
   a second electrode layer disposed on the second substrate and disposed opposite the first electrode layer;
   a first extraction electrode layer contacting the first electrode layer and being isolated from the second electrode layer and the electrochromic layer;
   a second extraction electrode layer contacting the second electrode layer and being isolated from the first electrode layer and the electrolyte layer; and
   a partition wall being electrically insulative and abutting the first extraction electrode layer so as to be sandwiched between the first extraction electrode layer and the electrolyte layer and abutting the second extraction electrode layer so as to be sandwiched between the second extraction electrode layer and the electrolyte layer.

2. The electrochromic apparatus according to claim 1, further comprising:
   a convex face disposed on one of the first substrate and the second substrate; and
   an optical lens disposed on another one of the first substrate and the second substrate.

3. The electrochromic apparatus according to claim 1, wherein the first extraction electrode layer includes a first lateral end face and the second extraction electrode layer includes a second lateral end face, and
   wherein the first lateral end face and the second lateral end face are electrically connected to an external circuit.

4. The electrochromic apparatus according to claim 1, wherein the first extraction electrode layer contacts the second substrate.

5. The electrochromic apparatus according to claim 1, wherein the second extraction electrode layer contacts the first substrate.

6. The electrochromic apparatus according to claim 1, wherein a peel strength of the partition wall against the electrochromic apparatus is greater than peel strength of the electrolyte layer against the electrochromic apparatus.

7. The electrochromic apparatus according to claim 1, further comprising:
   a contact portion disposed on the first extraction electrode layer and the second extraction electrode layer.

8. The electrochromic apparatus according to claim 1, wherein the partition wall includes a plurality of holes through which the electrochromic layer, the first extraction electrode layer, and the second extraction electrode layer are inserted, respectively.

9. The electrochromic apparatus according to claim 8, wherein the partition wall is made of a resin sheet.

10. The electrochromic apparatus according to claim 1, wherein the first extraction electrode layer and the second extraction electrode layer are disposed between the first substrate and the second substrate and at inner positions than both ends of each of the first substrate and the second substrate.

11. A method for manufacturing an electrochromic apparatus, the method comprising:
- forming a first electrode layer on a first substrate;
- forming an electrochromic layer on the first electrode layer;
- forming a first extraction electrode layer on the first electrode layer;
- forming a second electrode layer on a second substrate;
- forming a second extraction electrode layer on the second electrode layer;
- forming a partition wall including a plurality of holes through which the electrochromic layer, the first extraction electrode layer, and the second extraction electrode layer are inserted;
- adhering the partition wall to the first substrate;
- forming an electrolyte layer on the electrochromic layer; and
- bonding the first substrate with the second substrate.

12. The method for manufacturing the electrochromic apparatus according to claim 11,
wherein the partition wall is made of a resin sheet.

\* \* \* \* \*